United States Patent [19]
Tsuchiya et al.

[11] 3,867,858
[45] Feb. 25, 1975

[54] FROZEN FISH CUTTER

[75] Inventors: Takuzo Tsuchiya, Minneapolis; Kenneth J. Valentas, Golden Valley, both of Minn.; Donald W. Morse, Rowley, Mass.

[73] Assignee: The Gorton Corporation, Gloucester, Mass.

[22] Filed: July 30, 1973

[21] Appl. No.: 384,167

[52] U.S. Cl. ............... 83/113, 83/411 A, 83/409.2, 83/471.2
[51] Int. Cl. .......................... B26d 7/06, B26d 4/24
[58] Field of Search ......... 83/113, 116, 130, 411 A, 83/409.1, 409.2, 471.2

[56] References Cited
UNITED STATES PATENTS
1,366,568  1/1921  Knapp ........................... 83/411 A X
2,617,454  11/1952  Booth ......................... 83/411 A UX Primary Examiner—Willie G. Abercrombie
Attorney, Agent, or Firm—Anthony A. Juettner; Gene O. Enockson; Norman P. Friederichs

[57] ABSTRACT

Apparatus for cutting frozen meat. The apparatus includes a table for supporting a column of frozen meat and a rotating knife that moves with respect to the meat thereby severing slices from said meat. The apparatus includes a shoe for supporting the slice during cutting in order to prevent curling of the slice and a finger for removing the cut slice from the shoe.

12 Claims, 6 Drawing Figures

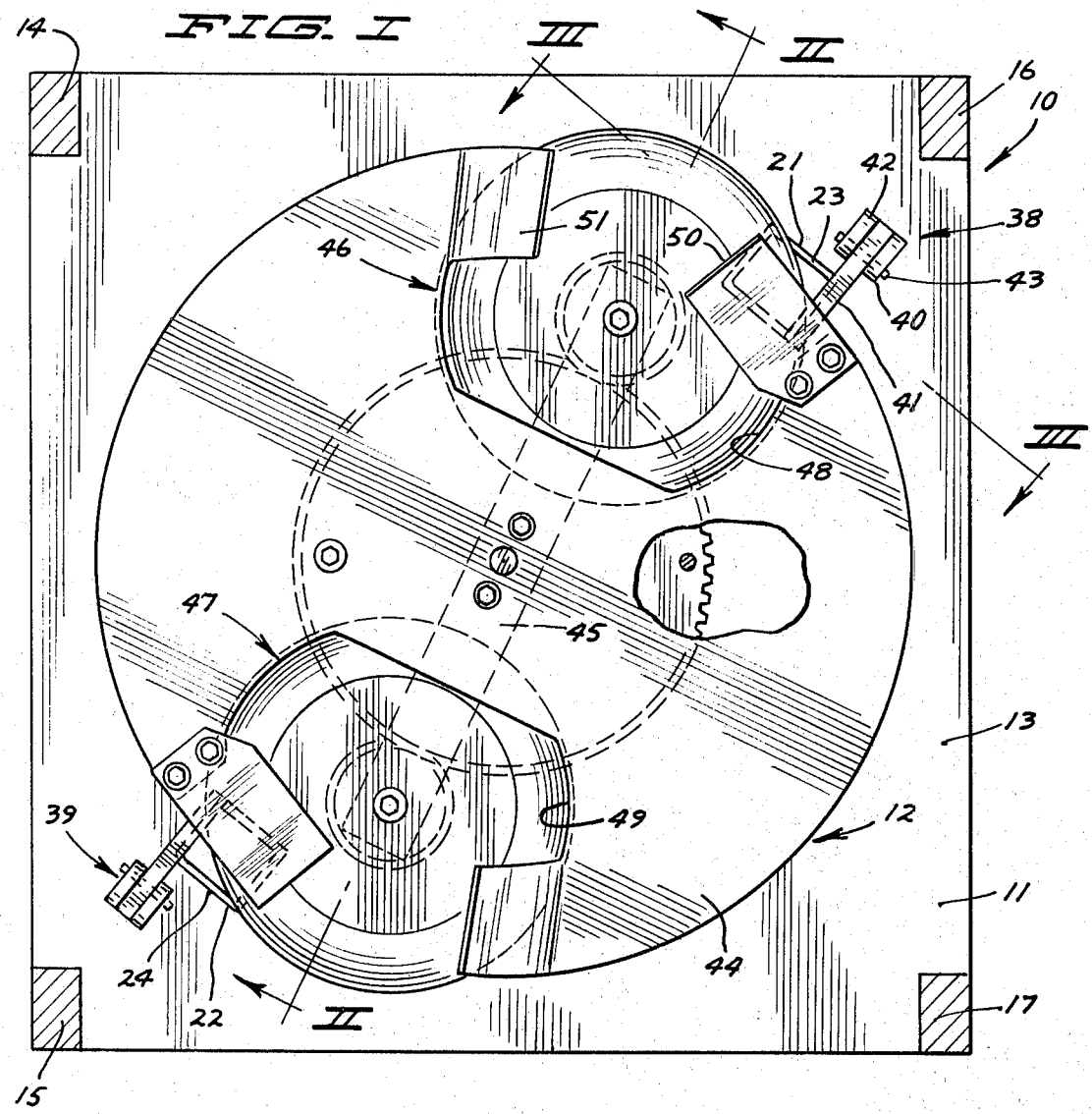
FIG. I
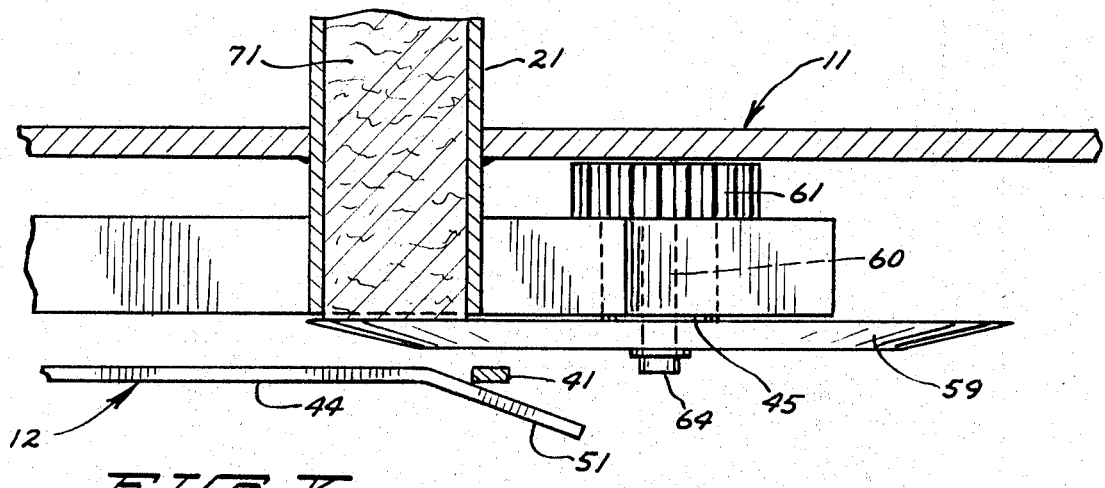
FIG. V

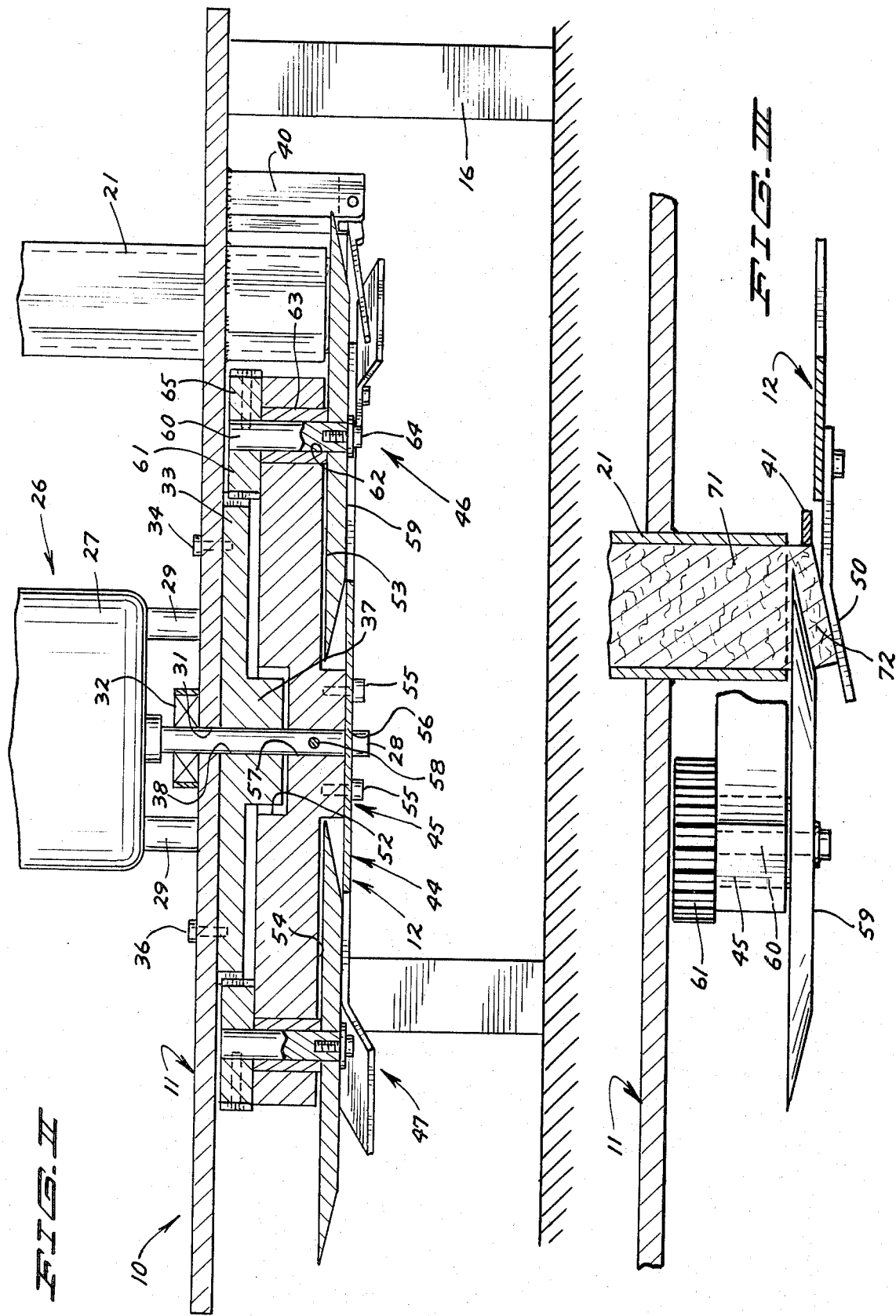

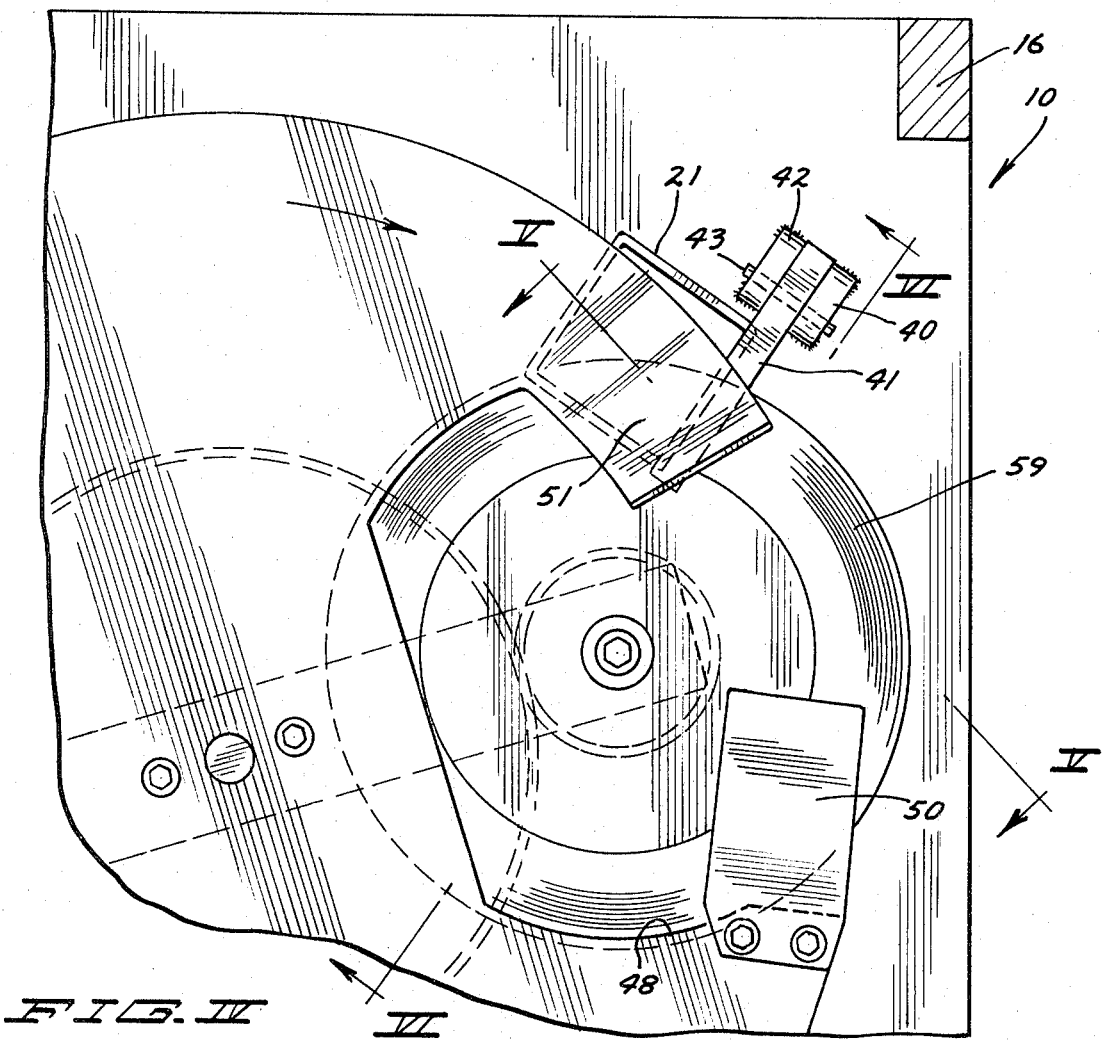
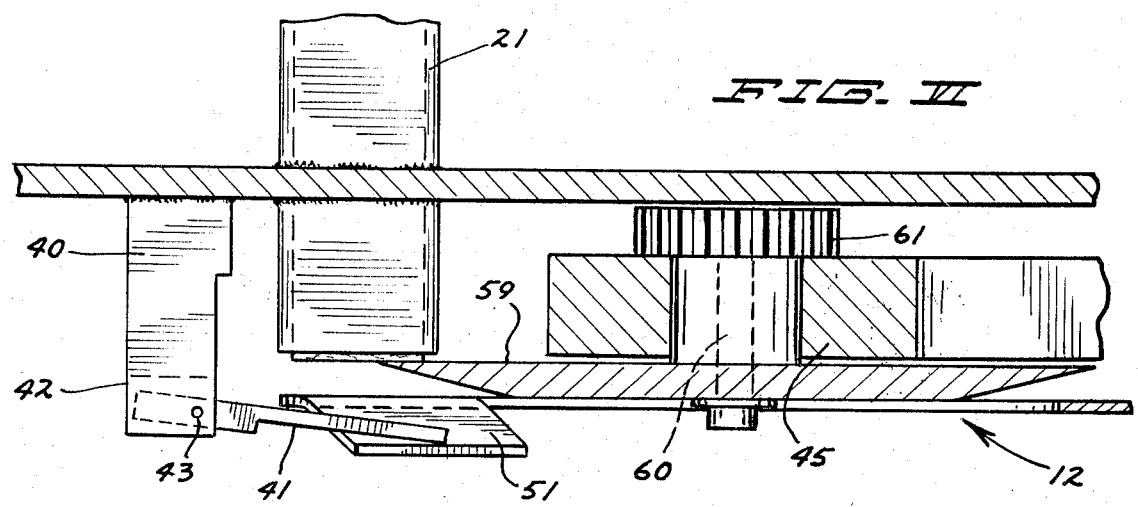

FROZEN FISH CUTTER

This invention relates to cutting or slicing apparatus. The present apparatus is particularly applicable to cutting uniform slices of frozen fish meat from blocks or so-called fish logs.

The use of power cleavers for cutting slices from frozen meat logs has been known in the past. Such a power cleaver is disclosed in U.S. Pat. No. 3,434,519. The power cleaver typically includes a first table including one or more magazines (i.e., tubes) which support and carry the log during the cutting operation. The power cleaver further includes a second table that supports the rotating cutting knife. The first table rotates with respect to the second table thereby moving the meat log into engagement with the knife to sever meat slices. Known power cleavers have not been completely satisfactory, since upon slicing a portion of frozen meat the cleaver imparts a curl to the sliced portion. The curled slices are undesirable in appearance. If one attempts to flatten the frozen sliced portion, the meat slice tends to crack and/or break. Further, known cleavers have a disadvantage in that the frozen meat slice may shatter during cutting particularly during final severing of the slice. It also is somewhat difficult to insert additional meat logs into the magazines during operation, since the magazines constantly move with first table. The present invention overcomes such problems.

THE PRESENT INVENTION

Apparatus according to the present invention is shown in the drawings as follows:

FIG. I shows a bottom view of the present invention with certain portions broken away;

FIG. II shows a cross sectional view taken along the line 2—2 in FIG. I;

FIG. III shows a sectional view taken along the line 3—3 in FIG. I;

FIG. IV is an enlarged view of a portion of the present cutting apparatus;

FIG. V is a cross sectional view of the cutting blade taken along the line 5—5 in FIG. IV;

FIG. VI is a cross sectional view of the cutting blade taken along the line 6—6 in FIG. IV.

The cutting apparatus 10 of the present invention, one preferred embodiment of which is shown in FIGS. I-VI may include an upper table assembly 11 and a lower table assembly 12.

The upper table assembly 11 (FIGS. I and II) includes a plate or table 13 which may be supported on suitable legs such as 14, 15, 16 and 17. The plate 13 may be of any rigid material such as stainless steel and the legs 14-17 may be of bar stock. The legs 14-17 may be secured to plate 13 such as by screws or welding. The table assembly 11 further includes a pair of magazines 21 and 22 which extend through suitable openings 23 and 24 defined in plate 13. The magazines 21 and 22 preferably are metal tubes having inside shape and dimension suitable for reception of the meat that is to be cut using the present invention. The meat slab may be of any desired cross sectional shape, circular, square, rectangular.

The table assembly 11 (FIG. II) has a motor 26 supported thereon for purposes hereinafter described. The motor 26 may be electrically driven and includes a body portion 27 and a rotatable shaft 28. The motor body portion 27 may be supported on plate 13 such as by motor mounts 29. The motor body portion 27 is locked with respect to plate 13. The rotatable motor shaft 28 extends through an opening 31 in plate 13. The shaft 28 may be engaged in a bearing 32 if so desired.

The table assembly 11 has a sun gear 33 which is mounted on the lower surface of plate 13 and locked with respect thereto such as by screws 34 and 36. The sun gear 33 has a hub 37 and an opening 38 in the center thereof through which the motor shaft 28 may rotatably extend.

The table assembly 11 (FIGS. I and VI) may include a pair of identical pivotable finger assemblies 38 and 39 which may be secured to the plate 13. The finger assembly 38, for example, has a support member 40 and a finger 41. The member 40 is secured to plate 13 and extends downwardly therefrom. The lower end of member 40 may have a fork 42 which receives one end of finger 41. The finger 41 is pivotably secured in fork 42 such as by a pin 43.

The lower table assembly 12 (FIGS. I and II) includes a plate 44, a support bar 45 and a pair of rotatable knife blade assemblies 46 and 47. The plate 44 may be constructed of stainless steel sheet material and is shown as being substantially circular in shape. The plate 44 (FIGS. I and IV) has a pair of cut away zones 48 and 49. The plate 44 has a pair of downwardly depending flanges adjacent each of the zones 48 and 49. For example, plate 44 has flanges 50 and 51 adjacent zone 48. The flange 50 may be metal strap which is secured to the lower surface of plate 44 by bolts or rivots. The flange 50 serves as a shoe to support the meat slice as it is being cut from the meat log. The flange 50 preferably is made of a material that is slightly flexible (i.e., springy). The flange 51 may be a portion of plate 44 which is bent downwardly.

The support bar (FIGS. I and II) may be formed from bar stock. The bar 45 may have a central zone 52 which is machined away to rotatably receive the hub 37 of sun gear 33. The bar 45 may have a pair of zones 53 and 54 which are provided by machining away portions of the bar 45. The zones 53 and 54 are for purposes hereinafter described. The plate 44 may be secured to bar 42 by screws 55. The plate 44 and bar 45 have openings 56 and 57, respectively, through which shaft 28 may extend. The bar 45 may be locked to shaft 28 by a key 58.

The knife blade assemblies 46 and 47 may be constructed substantially identical and therefore only knife blade assembly 46 will be described. Assembly 46 includes a circular blade 59, a rotatable shaft 60 and a planetary gear 61. The blade 59 is disposed in zone 53 of bar 45. The blade 59 is preferably beveled downwardly. The shaft 60 extends through an opening 62 in bar 45 and may be supported in a suitable bearing 63. The blade 59 may be secured in locked engagement with shaft 60 such as by a screw 64. The planetary gear 61 may be secured to the upper end of the shaft 60 such as by a key 65. The planetary gear 61 is in driven engagement with sun gear 33.

OPERATION OF THE INVENTION

Although the operation of the present invention is apparent from the previous description of the apparatus 10, it will be hereinafter further described. The apparatus 10 may be placed in operation by supplying electrical power to motor 26. The motor, which is mounted on stationary table 11, rotatably drives the movable table 12, for example, in a counter-clockwise direction as viewed in FIG. I which is a bottom view. A frozen meat log 71 such as fish is placed in at least one of the magazines such as 22. The meat slides downwardly through the magazine due to force of gravity or, if desired, a device may be used to force the meat downwardly through the magazine.

As table 12 moves with respect to table 11, the planetary gear 61, which is engaged with the sun gear 33, is rotatably driven and in turn drives the shaft 60 and the knife blade 59. The blade 59 preferably rotates at a greater rpm (revolutions per minute) than the table 12. As the blade 59 approaches and passes beneath the magazine 21 a slice of frozen meat is cut away from the meat log. The meat slice 72 is supported by the flange 50 as the slice 72 is being cut therefrom. Such support prevents curl from developing in the slice. The flange 50 is preferably essentially parallel with the beveled surface of blade 59 and is spaced from the beveled surface approximately the distance which corresponds to the thickness of the meat slice. The slice thus moves snuggly between the flange 50 and the beveled surface of the blade 59. Also, as the blade engages the first edge of the frozen meat, the finger engages the opposite edge of the meat and absorbs any transverse force which is applied to the frozen meat by the blade thereby preventing tearing of the meat particularly during the portion of the cut when the blade closely approaches said opposite edge. In other words, the finger 41 prevents any transverse movement of the frozen meat during and after cutting. The table 12 continues to move and the slice of cut meat, which lies on the flange 50, may be pushed off the flange 50 by finger 41. The finger 41, which lies in the path of the blade 59 during cutting, next pivots downward along flange 50 thereby avoiding the blade 59. The lower beveled edge of the blade 59 may engage the finger 41 to pivot the finger downwardly out of the path traversed by the orbiting blade. The flange 51 on table 12 next moves the finger 41 upwardly again into operating position.

The blade 59 supports the column of meat 71 as the open zone 48 passes therebeneath. The column of meat 71 is then supported by plate 44 until the next blade cuts the next slice from the column 71. The thickness of the meat slice may be adjusted by adjusting the spacing between plate 44 and blade 59. For example, screws 55 may be loosened or removed and spacers placed between plate 44 and support bar 45.

Although a particular embodiment of the present invention has been described herein in detail, various modifications may be made without departing from the broader scope of the present invention as defined in the appended claims. For example, in certain embodiments the table 11, which supports the magazines, may be movable and the table 12, which supports the knife blade assemblies, may be stationary. If desired, in other embodiments a greater or lesser number of magazines and/or knife blade assemblies may be present. Various other modifications would be apparent to one skilled in the art. Also, the blade in some instances may not be driven.

We claim:

1. Apparatus for cutting slices of meat from a column of frozen meat, said apparatus comprising:
   first support means including means for holding said column of meat in position for cutting of slices;
   at least one blade for cutting a slice from said column of meat;
   second support means including a shoe for supporting said slice during said cutting:
   means for moving said blade through said column of meat thereby cutting slices of meat from said column of meat; and
   means for removing the slice from said shoe.

2. The apparatus of claim 1 wherein said first support means comprise first table means and said second support means comprise second table means.

3. The apparatus of claim 2 wherein said first table means are stationary and said second table means are rotatable.

4. The apparatus of claim 3 wherein said second table means rotates around one axis and wherein said blade orbits around said one axis and rotates around a second axis.

5. The apparatus of claim 4 wherein said blade rotates at a greater rpm with respect to said second axis than said second table means rotates which respect to said first axis.

6. The apparatus of claim 4 wherein said means for rotating said blade comprises a sun gear that is locked with respect to said first table means and a planetary gear that is locked with respect to said blade, said planetary gear engaging said sun gear to rotate said blade as said planetary gear and said blade orbit said sun gear.

7. The apparatus of claim 1 further including finger means for engaging one edge of said column of meat while the blade moves through said column from the edge opposite said one edge and toward said one edge, thereby preventing transverse movement of the slice and preventing tearing of the meat due to the transverse force of said blade.

8. The apparatus of claim 4 further including finger means for engaging one edge of said column of meat while the blade moves through said column from the edge opposite said one edge toward said one edge, thereby preventing transverse movement of the slice and preventing tearing of the meat due to the transverse force of said blade.

9. The apparatus of claim 8 wherein said finger means comprise a pivotable finger that lies at least partially within the orbital path of said blade during the time period when said meat slice is being cut and is pivoted out of said path once said slice has been cut away.

10. The apparatus of claim 9 wherein said finger means is supported by said first table means and wherein said second table means includes means for pivoting said finger into and out of said orbital path.

11. The apparatus of claim 10 wherein said means for pivoting said finger out of said orbital path comprises a beveled edge of said blade.

12. The apparatus of claim 10 wherein said means for pivoting said finger into said orbital path comprises a flange depending from said second table means.

* * * * *